[19] United States Patent
Kreisfeld

[11] 4,419,844
[45] Dec. 13, 1983

[54] WEATHERSTRIP

[75] Inventor: Rudolf P. Kreisfeld, Edwardstown, Australia

[73] Assignee: Bridgestone Australia Pty. Ltd., Edwardstown, Australia

[21] Appl. No.: 440,844

[22] Filed: Nov. 12, 1982

[30] Foreign Application Priority Data

Nov. 12, 1981 [AU] Australia ............................... PF1536

[51] Int. Cl.³ ............................................... E06B 7/16
[52] U.S. Cl. ....................................... 49/475; 49/496; 49/498
[58] Field of Search ................. 49/475, 498, 496, 493, 49/489, 485

[56] References Cited

U.S. PATENT DOCUMENTS

| 2,734,239 | 2/1956 | Lombardi | 49/498 |
| 2,793,070 | 5/1957 | Wernig | 49/489 X |
| 3,413,389 | 11/1968 | Footner | 49/475 X |
| 3,775,907 | 12/1973 | Weaver et al. | 49/493 X |
| 3,883,993 | 5/1975 | Pullan | 49/498 X |

Primary Examiner—Philip C. Kannan
Attorney, Agent, or Firm—Charles A. Blank

[57] ABSTRACT

A weatherstrip is formed by a process of multiple extrusion to have sponge which extends from a free sealing end to a captive end, and on each side of the sponge at the captive end there is a respective extrusion of dense rubber flanking a reduced thickness portion of the sponge.

5 Claims, 7 Drawing Figures

U.S. Patent   Dec. 13, 1983   Sheet 1 of 2   4,419,844
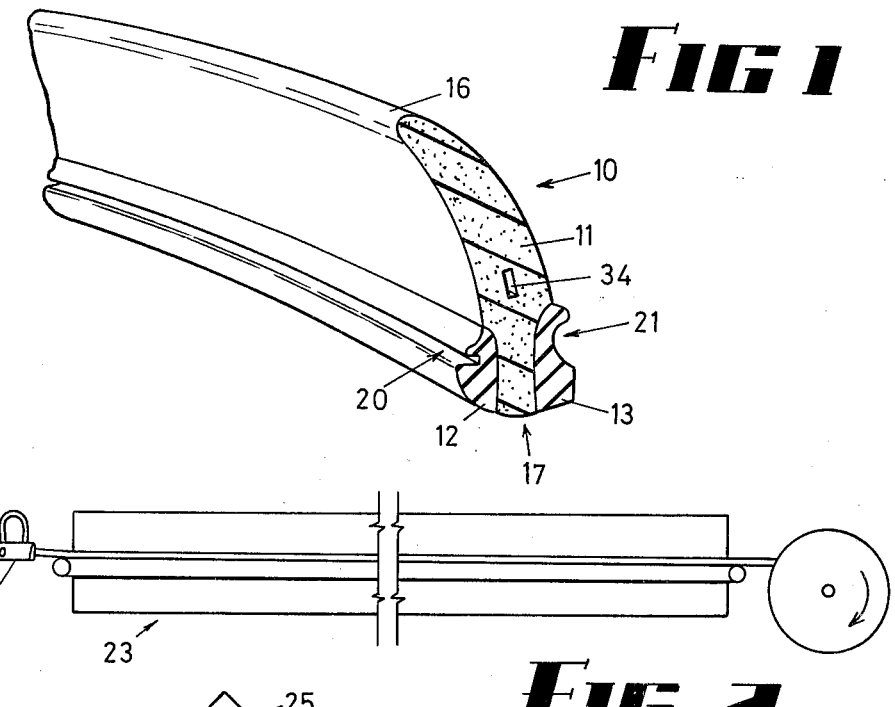
FIG 1
FIG 2
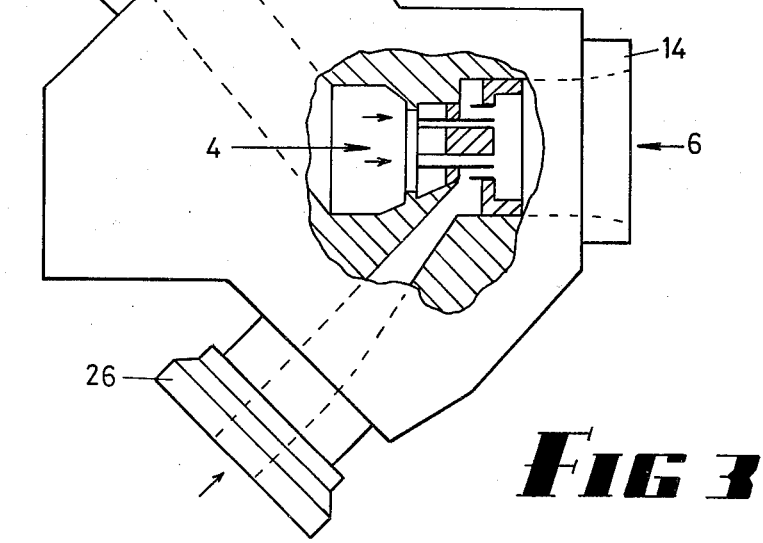
FIG 3

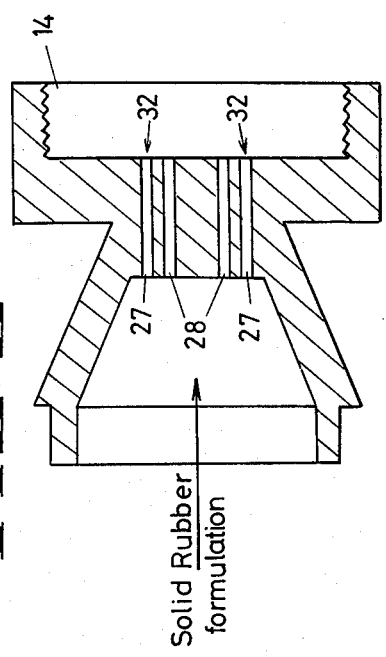
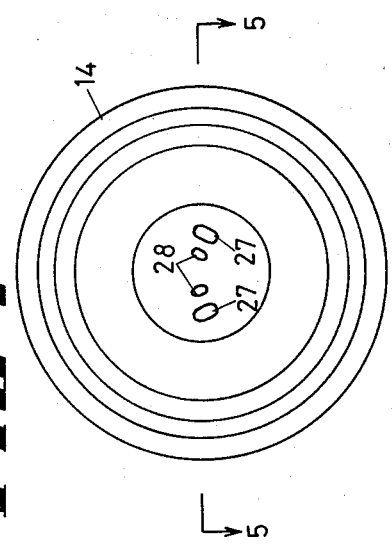
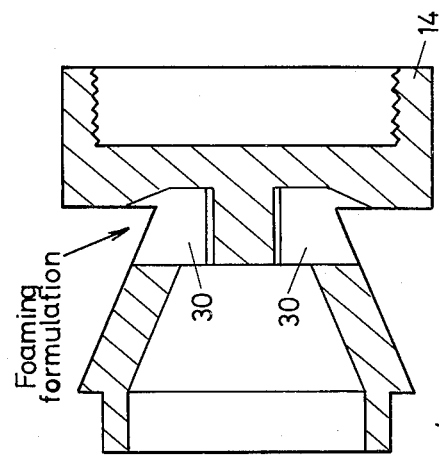
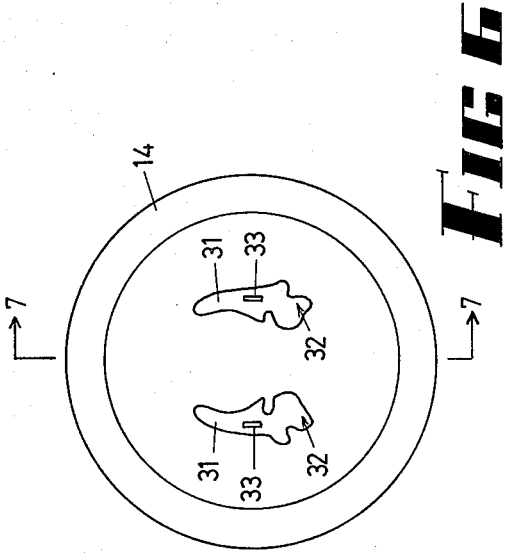

WEATHERSTRIP

This invention relates to a weatherstrip which is useful for excluding drafts around the door opening of a motor vehicle, although the invention is applicable to other products used for other purposes.

BACKGROUND OF THE INVENTION

Weatherstrips in the past have been produced by several processes, and in one process a skin of rubber is positioned in a die cavity, a quantity of unfoamed rubber (natural or synthetic) placed within the skin, a base of hard rubber applied, the die is closed, and the product is moulded. This is a tedious and expensive operation and to improve productivity it has been known to extrude a sponge simultaneously with a base section of dense rubber through a dual extrusion head, adhering the two together before curing. In this respect the reader's attention is drawn to the Applicant's Australian Patent No. 291,754 (corresponding U.S. Pat. No. 3,413,389; Japanese Pat. No. U.M. 51696 and West German Patent No. 1504883.6). However, either the bead which is extruded has considerable hardness, and is difficult to insert in a retaining channel of a vehicle, or, if the extrusion is wholly of single or two hardness sponge rubber without any rubber of high density, there is difficulty in retention of the strip in the retaining channel and it will be found to be easily dislodged.

The main object of this invention is to provide improvements whereby a strip is much more easily inserted in a retaining channel than a strip having a solid rubber bead, but less likely to be dislodged therefrom than a strip comprising solely sponge or a combination of sponges.

BRIEF SUMMARY OF THE INVENTION

In one embodiment of this invention a weatherstrip is formed to have sponge which extends from a free sealing end to a captive end, and on each side of the sponge at the captive end there is a respective extrusion of dense rubber flanking a reduced thickness portion of the sponge.

With this arrangement, since the sponge is of less thickness at the captive end, there is less resistance to deformation than if the strip were extruded of solid dense rubber but more resistance than if the extrusion were of a total sponge product. Furthermore, since the portions which engage a supporting structure are of a material of higher density than the sponge, the strip is unlikely to become dislodged due to movement or deterioration, and the durometer hardness of the dense material may be adjusted to an optimum level.

More specially, the invention consists of a weatherstrip useful for excluding drafts around a door opening of a motor vehicle, having a sponge portion and two dense portions, all of ethylene propylene diene monomer, the weatherstrip having a constant cross-sectional shape which includes a free sealing end, and a captive end having a pair of oppositely facing retaining recesses for securing of the weatherstrip to a supporting structure, the sponge portion extending between said ends but being of reduced thickness at its captive end, the reduced thickness captive end being flanked on each side by the dense portions, said dense portions comprising outer surfaces defining the retaining recesses.

BRIEF DESCRIPTION OF THE DRAWINGS

An embodiment of the invention is described hereunder in some detail with reference to, and is illustrated in, the accompanying drawings, in which:

FIG. 1 is a perspective view of a rubber weatherstrip,

FIG. 2 is a diagrammatic elevation of the extrusion head and curing oven,

FIG. 3 is a partly sectioned diagrammatic representation of a dual extrusion head, FIG. 4 is an end view of the extrusion die indicated by arrow 4 in FIG. 3, FIG. 5 is a central plan section on line 5—5 of FIG. 4, FIG. 6 is an end view of the extrusion die indicated by arrow 6 in FIG. 3, and FIG. 7 is a central elevational section on line 7—7 of FIG. 6.

In this embodiment a weatherstrip 10 is formed by extrusion of a sponge portion 11 and two dense portions 12 and 13 through a die 14 of a multiple extrusion head 15. The extending portion has a free scaling end 16 of the strip and is formed from closed cell EPDM (ethylene propylene diene monomer) sponge and the sponge extends from the free end 16 to a captive end 17, but at the locality of the captive end the sponge is of reduced thickness so that there is some resilience but insufficient resilience for the dense, high durometer portions 12 and 13 to be easily dislodged from a retaining channel. The width continuously reduces from the captive end to the free end.

On one side of the weatherstrip, the high durometer EPDM strip has a retaining recess defined by the walls of a narrow channel 20 arranged to be positioned over the flange of a metal retaining channel on a motor vehicle, while on the other side a second retaining recess is defined by the walls of a part circular groove 21 which facilitates moving that other side into engagement with the other retaining channel flange. In both cases there is a considerable area of interface between the sponge and the solid rubber, so that possibility of delamination is reduced.

All the rubber is an oil extended ethylene propylene diene monomer with a high ethylene norbornene content, compounded with carbon black and naphthenic oil, and is cured in a microwave hot air oven 23, travelling at 15 meters per minute when extruded, but expanding during curing to travel at about 20 meters per minute when it emerges from the oven after curing. The sponge component is chemically blown by a nitrogen producing blowing agent and produces a homogeneous closed cell sponge with high resilience and a high state of cure. It is within the purview of those skilled in the art to vary formulation, extrusion speeds, time and temperature of curing to achieve results which are appropriate for different respective application conditions.

FIGS. 3, 4, 5, 6 and 7 are diagrammatic representations which illustrate the extrusion head and die.

The extrusion head 15 has an inlet fitting 25 for introduction of the EPDM rubber containing no blowing agent, while the inlet fitting 26 introduces the rubber with the blowing agent. The dense rubber from fitting 25 passes into die 14 and forms the dense rubber portions of the strip 12 and 13 by flowing through the respective apertures 27 and 28. It will be noted that the die 14 extrudes two strips simultaneously.

The sponge-forming rubber from inlet fitting 26 flows through passage into space 30 (FIG. 7), and is guided by the walls 31 of extrusion apertures 32 to flow from the die, having the cross-section illustrated in FIG. 1, with the sponge-forming rubber flowing into face-to-face contact with the dense rubber extrusions 12 and 13. Each extrusion aperture 32 contains a projecting pin 33 of rectangular section, which forms an aperture 34 in the weatherstrip 10 extending along its most highly flexed part, and reduces skin stresses by providing a facility for the outer faces to collapse towards each other. Details of construction of multiple extrusion heads are within the purview of those skilled in the art.

I claim:

1. A weatherstrip useful for excluding drafts around a door opening of a motor vehicle, having a sponge portion and two dense portions, all of ethylene propylene diene monomer, the weatherstrip having a constant cross-sectional shape which includes a free sealing end, and a captive end having a pair of oppositely facing retaining recesses for securing of the weatherstrip to a supporting structure, the sponge portion extending between said ends but being of reduced thickness at its captive end, the reduced thickness captive end being flanked on each side by the dense portions, said dense portions comprising outer surfaces defining the retaining recesses.

2. A weatherstrip according to claim 1 wherein each said retaining recess is defined by the walls of a narrow channel arranged to be positioned over a sheet metal flange and the other is defined by a curved wall of a groove.

3. A weatherstrip according to claim 1 or claim 2 further comprising an aperture extending along the weatherstrip through the sponge portion and adjacent the dense portions.

4. A weatherstrip according to claim 1 or claim 2 wherein the width of the weatherstrip continuously reduces from the captive end to the free end.

5. A weatherstrip according to claim 1 or claim 2 which is formed by a multiple extrusion process.

* * * * *